United States Patent [19]

Scott

[11] Patent Number: 4,824,647
[45] Date of Patent: Apr. 25, 1989

[54] METHOD OF REMOVING ACID GAS POLLUTANTS FROM FLUE GASES

[76] Inventor: Donald S. Scott, 382 Arden Place, Waterloo, Ontario, Canada, N2L 2N7

[21] Appl. No.: 54,509

[22] Filed: May 27, 1987

[30] Foreign Application Priority Data

Jun. 3, 1986 [CA] Canada .................................. 510745

[51] Int. Cl.$^4$ ...................... C01B 17/00; C01B 21/00; B01J 8/00
[52] U.S. Cl. .................................. 423/235; 423/239; 423/242; 423/244
[58] Field of Search ............... 423/244 A, 244 R, 239, 423/239 A, 235, 235 D, 242 A, 242 R

[56] References Cited

U.S. PATENT DOCUMENTS 4,645,654  2/1987  Barczak ............................... 423/244
4,702,899 10/1987  Barczak et al. ...................... 423/244

*Primary Examiner*—Gregory A. Heller
*Attorney, Agent, or Firm*—Daryl W. Schnurr

[57] ABSTRACT

A method of removing acid gas pollutants from flue gases and the like involving contacting the gas with a coal-water slurry, said coal being a type that has exchangeable cations. The exchangeable cations are exchanged with hydrogen ions and form salts with the sulfur oxides and nitrogen oxides in the flue gas, thereby removing substantially all of the pollutants from the flue gas.

10 Claims, 3 Drawing Sheets

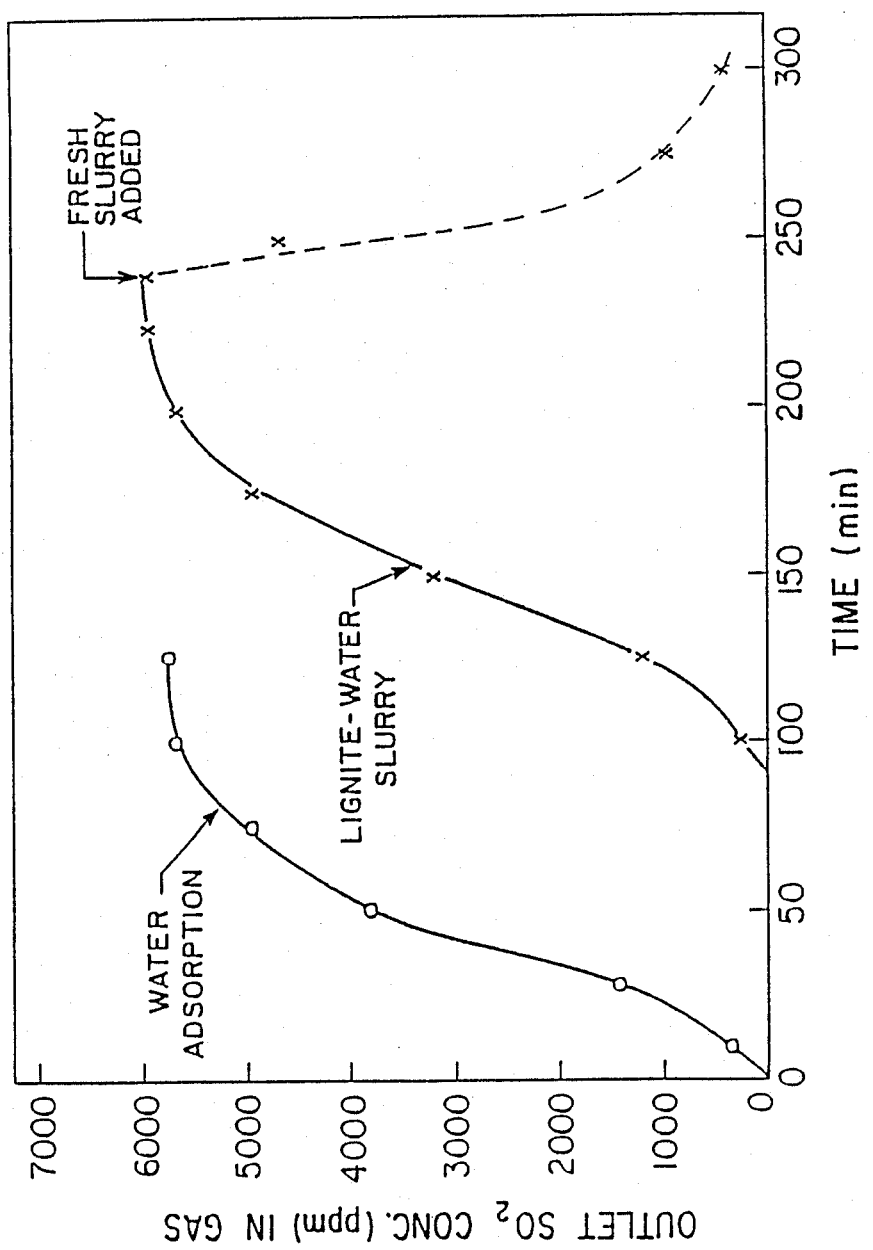
Figure 2 Absorption of $SO_2$ (6000 ppm) in Water and Lignite-Water Slurry

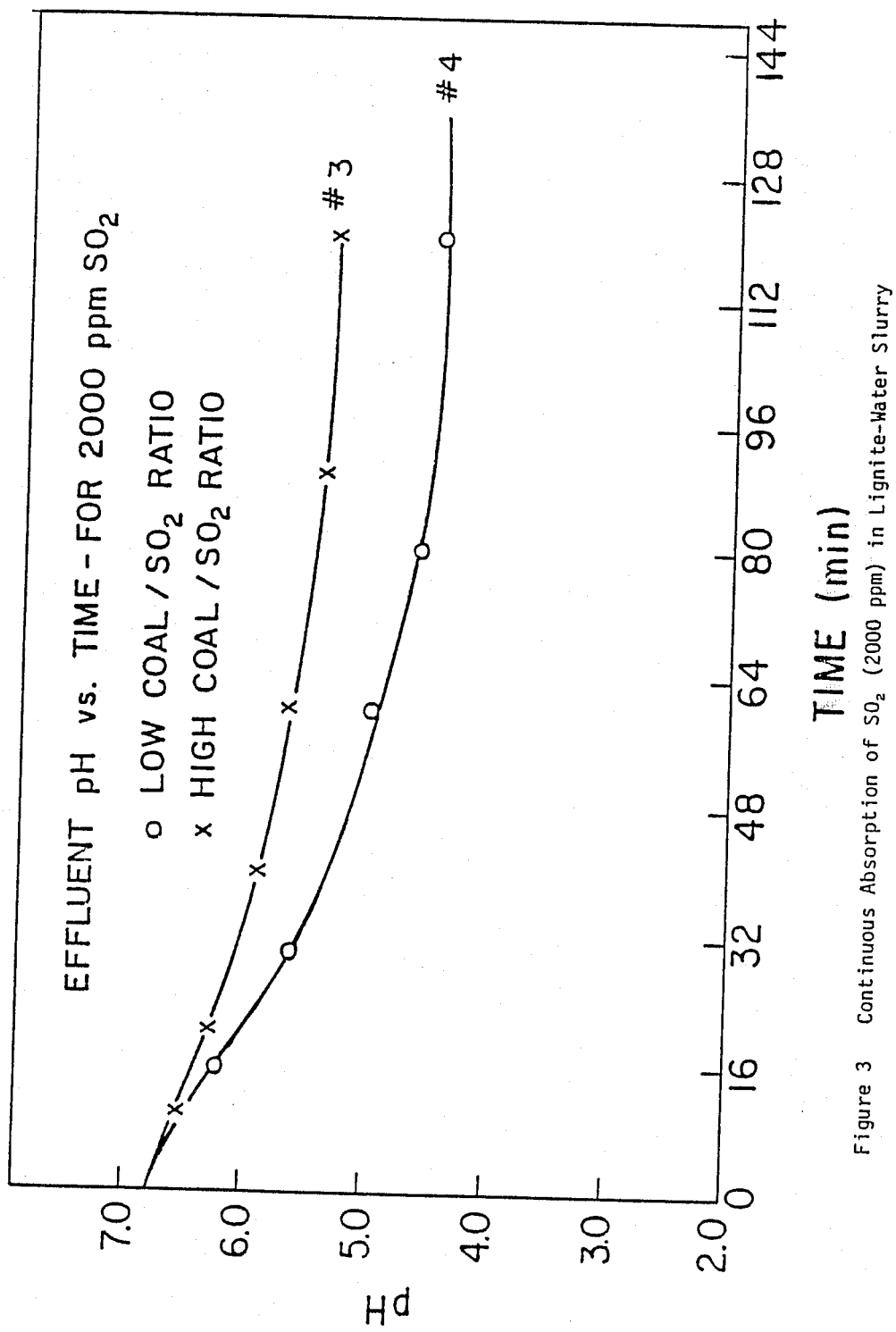
Figure 3  Continuous Absorption of $SO_2$ (2000 ppm) in Lignite-Water Slurry

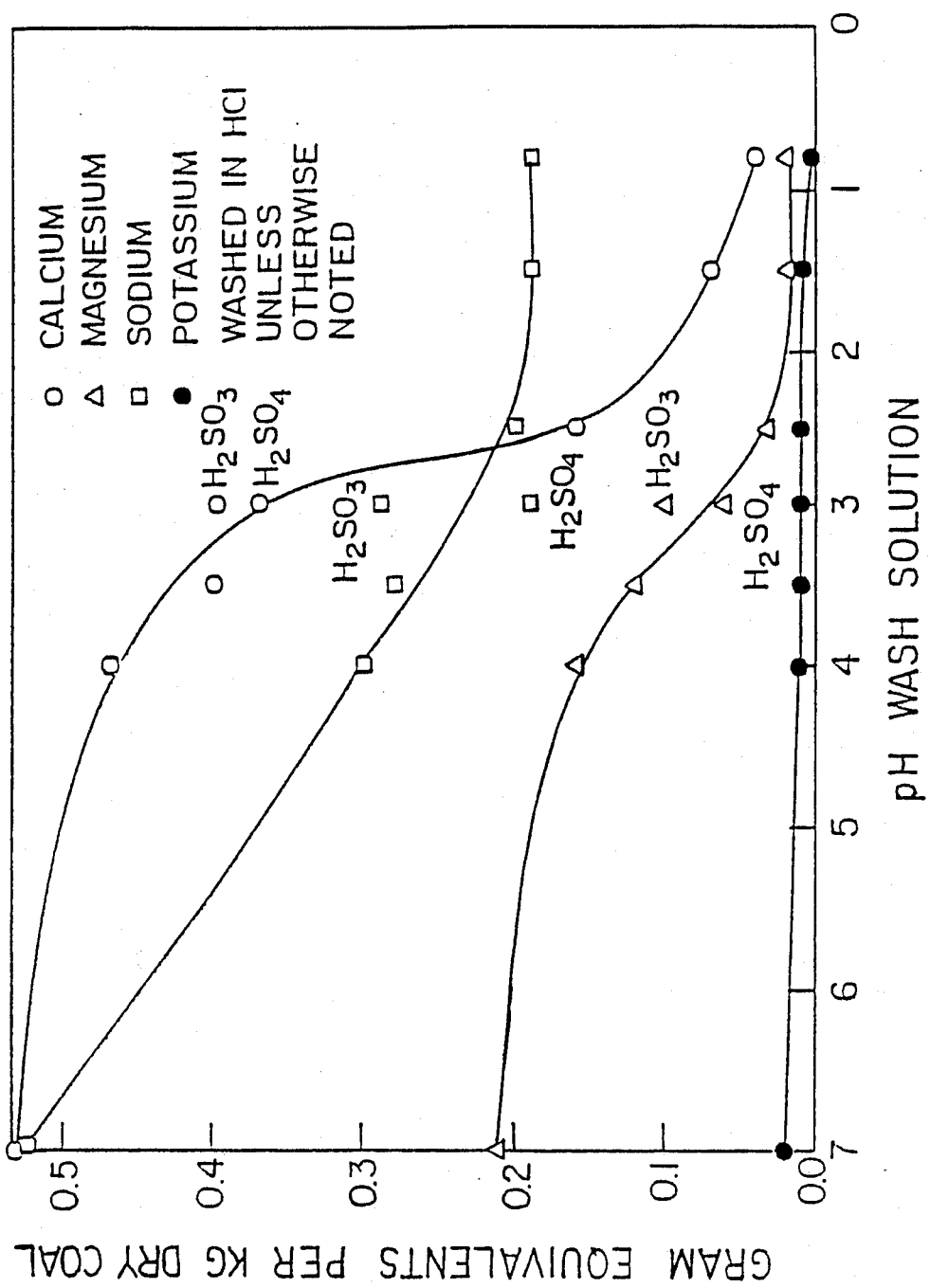
Figure 1 Cation Content vs. pH of Acid Washing for Estevan Lignite #4

METHOD OF REMOVING ACID GAS POLLUTANTS FROM FLUE GASES

BACKGROUND OF THE INVENTION

1. Field of the Invention

This invention relates to a method of removing acid gas pollutants from a gas stream and in particular a method of removing sulfur oxides and/or nitrogen oxides from gas streams.

2. Description of the Prior Art

It has long been recognized that the presence of noxious gases, for example, sulfur dioxide, sulfur trioxide, nitrogen oxide and nitrogen dioxide in gas streams that are released to the atmosphere causes acid rain and is extremely damaging to the environment. Therefore, numerous methods and processes have been devised to remove these gas pollutants from a gas stream prior to releasing said stream into the environment. Also, as these gas pollutants are usually a product of combustion, one known method of controlling the sulfur content of gas streams is to use low sulfur content fuels. In addition, processes have been devised to pretreat the fuel to remove the sulfur before combustion. The supplies of low sulfur fuel are rapidly becoming depleted, necessitating the use of higher sulfur content fuels in the future.

One known method of controlling the emission of sulfur dioxide and other sulfur gases is to add a reagent, for example, limestone or dolomite directly into the combustion chamber where it reacts with the sulfur during combustion and the sulfur so removed becomes a constituent of the ash. Another known method of removing gas pollutants is to treat the gaseous products of combustion by reaction with a dry reagent (i.e. dry scrubbing) or by contacting the flue gases with a liquid or liquid slurry reagent to absorb the sulfur dioxide, sulfur trioxide and nitrogen oxide components (i.e. wet scrubbing). Known wet scrubbing reagents are aqueous solutions of various chemicals such as calcium carbonate, calcium hydroxide, magnesium oxide, magnesium carbonate, sodium hydroxide, sodium carbonate, sodium bicarbonate, ammonium sulfites, etc. There is a great deal of literature available describing these wet scrubbing reagent and methods of using them. However, all of these known reagents suffer from one or more disadvantages in that they do not remove sufficient gas pollutants from the gas stream; or, their use is extremely expensive; or, they create further pollutants that must be further treated; or, they can be dangerous to use; or, they require the use of highly-skilled operators. It is also known to use coal to control sulfur oxides or nitrogen oxides. However, the coal is not used in a wet scrubber but is used as an adsorbent where the sulfur oxides and nitrogen oxides are adsorbed directly on a char surface of the coal and become part of the char. No ion exchange is involved in this prior method.

SUMMARY OF THE INVENTION

It is an object of the present invention to provide a method of wet scrubbing a gas stream containin acid gas pollutants that is relatively inexpensive, safe to use and highly efficient in that it can remove substantially all of the acid gas pollutants from a gas stream being treated.

In accordance with the present invention, a method of wet scrubbing a gas stream containing acid gas pollutants, said pollutants being at least one of a sulfur oxide or a nitrogen oxide comprises introducing said gas and a slurry of a low rank coal in water into any appropriate type of slurry-gas contactor. The coal has exchangeable cations associated with it. The method further involves contacting said gas with said slurry while controlling pH in a range of 2.5 to 6. Many of said cations are replaced during said contact by hydrogen ions formed in said slurry. The exchangeable cations combine with said pollutants to form soluble salts in said slurry. By this method, substantially all of said pollutants are removed from the gas stream and pollutants are removed from the coal and the ash content of the coal is reduced. The gas stream and slurry are removed from the contactor. The liquid part of the slurry is separated from the coal, the soluble salts being taken away from the coal in the liquid slurry.

BRIEF DESCRIPTION OF THE DRAWINGS

In the accompanying drawings, there are shown various graphs relating to the use of the method of the present invention:

FIG. 1 is a graph showing the effect of pH on the degree of cation exchange using various acids;

FIG. 2 is a graph comparing the outlet concentration of sulfur dioxide with time: firstly, when sulfur dioxide gas is contacted with water; and secondly, when sulfur dioxide gas is contacted with a lignite-water slurry;

FIG. 3 is a graph showing the variation of effluent pH with time when sulfur dioxide is contacted with a lignite-water slurry.

DESCRIPTION OF A PREFERRED EMBODIMENT

It is known that some of the inorganic material of coal, normally classified as ash, which occurs in low rank coals such as rrown coals, lignites or subbituminous coals is in fact associated chemically with the organic material of the coal. Often, part or all of the calcium, magnesium, sodium and potassium content of these coals is in the form of cations that can be exchanged to some degree for other cations. These exchangeable cations in coal can be referred to as alkali and alkaline earth cations. The ion exchange properties of raw coals is inferior to that of commercial synthetic ion exchangers.

From FIG. 1, it can be seen that the degree of replacement of these exchangeable cations with acids depends not only on the nature of the cation but also on the strength of the particular acid used, as measured by the pH value. The actual type of acid used can be varied as long as the desired pH is reached. Generally, the lower the pH of the acid used, the greater will be the degree of exchange of the cations. Further, sodium ions can usually be exchanged to a lesser degree than calcium, magnesium or potassium ions.

When a gas containing amounts of sulfur dioxide resulting from fuels with an average sulfur content, for example, about 2% by weight, is contacted with a water slurry containing lignite-coal particles and the lignite particles also contain exchangeable calcium, magnesium, sodium or potassium cations, hydrogen ions in the slurry will be exchanged for those exchangeable cations held by the coal organic matrix. The exchangeable cations can then combine with the sulfur containing anions of the solution to form a complex mixture of calcium, magnesium, sodium and potassium sulfites, bisulfites and sulfates. Some of the salts that can form are of limited solubility and therefore control of effluent pH and slurry concentration is important because it is desirable to keep the sparingly soluble salts in solution so that they can be subsequently washed from the coal. The solubility of calcium sulfites in particular is enhanced by a lower pH. Also, the lower pH prevents the removal of carbon dioxide from the flue gases by the reaction of calcium or magnesium ions with dissolved carbon dioxide in the solution to form insoluble carbonates or bicarbonates.

There are numerous different sulfur oxides and nitrogen oxides that are typically found in gas streams resulting from combustion. Of course, the source of the gas stream can vary and the presence of and concentration of particular chemical compositions will also vary. Usually, sulfur is present as either or both sulfur dioxide and sulfur trioxide. However, there are numerous other forms in which sulfur can be present in aqueous solutions, for example, bisulfite ion, sulfite ion, sulfate ion, thiosulfate ion or tetrathionate ion. Nitrogen is usually present in the gas phase as nitric oxide and/or nitrogen dioxide However, nitrogen can also be present in various forms, for example, nitrous oxide, dinitrogen trioxide, dinitrogen tetraoxide and dinitrogen pentoxide. These examples of sulfur oxides and nitrogen oxides are not intended to be exhaustive and the use of the present invention is not limited to the sulfur oxides and nitrogen oxides specifically referred to. Also, the use of the present invention is not restricted to low or average sulfur conten fuels.

In the examples that follow, a method of wet scrubbing a gas stream containing sulfur dioxide is described. The invention is not restricted in any way to gas streams that contain sulfur dioxide but can be applied to any gas stream containing any sulfur oxide and/or any nitrogen oxide, or any other acid gases, for example, hydrogen chloride, that may be formed during combustion of the fuel.

In each of the examples, the apparatus used was a 1.2 m high, 5 cm diameter, pyrex bubble column. The slurry was mixed separately except in the first Example where the slurry is distilled water only) and transferred to the column using a variable speed peristaltic pump. The gas streams were mixed to the desired composition and introduced continuously through a perforated plate sparger. The gas and slurry exited the top of the column and entered a 250 ml magnetically stirred disengaging vessel containing a pH electrode. The gas stream exited from the top of the disengaging vessel and the slurry left from the bottom at a controlled flow rate to keep the pH electrodes submerged. The pH of the slurry was measured continuously and was recorded using a dual pen recorder. The slurry was collected in a 4 l disengaging vessel. A sample valve located between the two disengaging vessels allowed periodic slurry samples to be collected. The gas streams were combined and passed through a salt-ice-water condenser and a cotton wool filter to remove any moisture or particulate matter. An ANARAD (a trade mark) infrared analyzer continuously measured the sulfur dioxide concentration.

EXAMPLE NO. 1

A sulfur dioxide-air mixture (5,750 ppm SO$_2$) was bubbled through 1.5 l of distilled water in the pyrex bubble column at the rate of 5 l per minute. As shown in FIG. 2, the outlet sulfur dioxide concentration varied with time and began to increase immediately as the water gradually became saturated with sulfur dioxide. After approximately 110 minutes, the water became saturated with sulfur dioxide and the gas outlet concentration of sulfur dioxide equalled the inlet concentration.

EXAMPLE NO. 2

A sulfur dioxide-air mixture (6,000 ppm SO$_2$) was bubbled through 1.5 l of a 12 weight percent lignite-water slurry in the pyrex bubble column at the rate of 5 l per minute. The lignite was ground to −230 mesh As shown in FIG. 2, the run proceeded for approximately 90 minutes before any sulfur dioxide "break-through" in the outlet gas occurred In other words, all of the sulfur dioxide was reacted in the lignite-water slurry. After an additional 90 minutes, the break-through curve was almost identical to that for sulfur dioxide absorption in water. After approximately 240 minutes, the lignite-water slurry had become saturated and the outlet concentration of sulfur dioxide equalled the inlet concentration.

In the first 90 minutes of Example No. 2, the sulfur dioxide was reacting with the slurry according to the following mechanism:

$$SO_2 + H_2O \rightleftharpoons H_2SO_3 \rightleftharpoons H^+ + HSO_3^- \qquad (1)$$

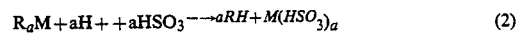

$$R_aM + aH^+ + aHSO_3^- \rightarrow aRH + M(HSO_3)_a \qquad (2)$$

R is the coal material;
M is the exchangeable cation;
a is the valence of the exchangeable cation.

In the second 90 minutes, the reaction slowed as the available exchangeable cations, M, were replaced by hydrogen ions and sulfur dioxide began to appear in the outlet gas until the slurry had become saturated and the outlet concentration equalled the inlet concentration.

After approximately 240 minutes, fresh slurry was added on a batch basis. As can be seen from FIG. 2, the sulfur dioxide concentration in the outlet gas immediately dropped off.

EXAMPLE NO. 3

A 5% (weight/weight) lignite-water slurry was continuously pumped into the column at a rate of 30 ml per minute. Simultaneously, a 2,000 ppm sulfur dioxideair mixture was continuously bubbled through the slurry at the rate of 5 l per minute As shown in FIG. 3, the effluent pH for Example No. 3 was recorded with time. It can be seen that the slurry pH decreased from 6.75 at the beginning of Example No. 3 to a steady-state value of 5.35.

EXAMPLE NO. 4

The slurry concentration was decreased to 3% (weight/weight) lignite in distilled water at a flow rate of 30 ml per minute. A 2,000 ppm sulfur dioxide-air mixture was introduced or bubbled through the slurry at the rate of 5 l per minute. As shown in FIG. 3, the pH decreased from an initial value of 6.75 to a steady-state value of 4.45. Thus, with a less concentrated coal-water slurry, the pH was lower. In both Example No 3 and Example No. 4, there was essentially no sulfur dioxide "break-through" in the outlet gas.

Samples of the slurry were taken at various times throughout Example No. 4. Table 1 gives the cation analysis of a slurry sample taken after 120 minutes. The cation analysis of the coal sample is compared to that of untreated or raw coal and also to a sample that was acid washed in a batch vessel at a pH of 4. It can be seen that the cation content of the coal from the bubble column of Example No. 4 is lower than that of the raw coal showing that many of the cations in the coal exchanged with protons formed when the sulfur dioxide was absorbed in water.

A sulfur balance was performed on the slurry obtained from Example No. 4 to determine the distribution of sulfur between the coal and the liquid. Without washing the used coal, it was determined that over 80% of the sulfur was found to be in solution and the remaining 20% was found to be in the coal. If the coal were washed, this would greatly increase the amount of sulfur containing salts in solution.

Thus, it has been shown that a lignite-water slurry is capable of removing sulfur dioxide from a gas stream with close to 100% efficiency at the test conditions used. Simultaneously, the lignite undergoes ion exchange and some of the exchangeable cations are replaced with protons or hydrogen ions. While 80% of the sulfur was located in the liquid slurry and only 20% was adsorbed on the coal, better washing of the coal, multi-stage scrubbing or use of a lower slurry pH would result in less of the sulfur remaining in the coal and more being found in solution.

It is desirable to produce a final extract which is somewhat acidic and which may contain some free dissolved sulfur dioxide. There are two reasons for this: firstly, the solubility of calcium sulfites formed increases markedly as pH decreases; and secondly, at a lower pH, the formation of carbonates is prevented. If carbonates form, they can cause loss of scrubbing reagent as well as deposition problems in wet scrubbers. The most advantageous pH for carrying out the method of the present invention can be readily calculated from known solubility equilibrium graphs given the operating conditions, gas composition, exchangeable cation analysis of the coal and the ion exchange equilibrium characteristics of the particular coal. Usually, the operating pH for the method of the present invention will be in the range of 2.5 to 6.

The desired effluent pH can be obtained using two or more stages of scrubbing with removal of free sulfur dioxide from the final liquid extract, by heating or other means, and recycling this liberated sulfur dioxide to the appropriate scrubbing stage. Alternatively, the final extract can be neutralized if the mildly acidic nature is considered to be undesirable.

The salts in solution will be a complex mixture of mainly sodium, potassium, calcium and magnesium sulfites, sulfates, nitrites and nitrates, depending on the gas composition and the amount of oxidation occurring. At suitable pH values of the effluent liquid extract, with an appropriate weight percent of coal in the slurry, nearly all of the salts will remain in solution. Therefore, filtering and washing of the used coal will result in high recoveries of the sulfur in the gas stream as dissolved salts in aqueous solution. These salts may then be recovered or the solution further treated by known technology before disposal, if this is necessary or desirable.

It should also be noted that the quality of the coal used in the method of the present invention has been significantly improved. Much of this quality improvement is due to reduction in ash content. As shown in Table 1, up to 30% of the ash has been removed. In other experiments conducted using the method of the present invention, ash removals of 50% to 60% have been achieved.

Other advantages of the method of the present invention is that the sodium content can be significantly reduced, as shown in FIG. 1, by using the method of the present invention. A reduction in the sodium content will decrease the tendency of the coal to form deposits on heat exchange surfaces.

While the coal used in the examples is Saskatchewan Lignite, other coals are also suitable as a scrubbing agent in accordance with the method of the present invention. For example, brown coals and sub-bituminous coals can be used. Since all coals have their own chemical characteristics, no general statement can be made concerning the value of any particular type of coal or rank of coal. Indeed, coals of the same rank from different fields or seams might behave quite differently when used to carry out the method of the present invention. Experimental assessment of the amount and type of exchangeable cations is important in order to evaluate the performance of a particular coal as a scrubbing agent for sulfur oxides or nitrogen oxides.

However, lignite coals or low rank sub-bituminous coals are preferred scrubbing agents because they retain a stable particle shape and usually have a lower moisture content than brown coals. Particle size of the coals could be as small as will still allow for fast filtration and washing rates.

TABLE 1

Exchangeable Cation Analysis of Coal (Saskatchewan Lignite) gm. equivalents/kg. of dry coal

|  | Coal - $SO_2$ Run #4 Extract pH = 4.5 | Batch Vessel Acid Washed HCl pH = 4.0 | Raw Coal |
|---|---|---|---|
| Ca | 0.46 | 0.42 | 0.53 |
| Mg | 0.15 | 0.12 | 0.21 |
| Na | 0.36 | 0.26 | 0.53 |
| K | 0.02 | 0 | 0.02 |
| Total | 0.99 | 0.80 | 1.29 |

Generally, a size of approximately +74 μm (i.e. +200 mesh) would be suitable for most lignites or sub-bituminous coals. However, any reasonable coal particle size will work and varying sizes will only affect the efficiency. A range of 50 to 200 μm is preferred for the coal particles. Still more preferable is a coal particle size of approximately 75 μm. Many lignites have a relatively high water content, but are more satisfactory in this respect than many brown coals. Many brown coals normally have potentially useful exchangeable cation content and brown coals can also be used to carry out the method of the present invention. However, brown coals may not produce the same satisfactory results as lignite coals or low rank sub-bituminous coals because of undesirable physical properties.

The pressure and temperature at which the coal-water slurry reagent is used are not critical, provided that an adequate performance can be obtained. Lower temperatures allow more complete removal of sulfur oxides and nitrogen oxides as well as improved solubility of some sparingly soluble sulfite and sulfate salts formed. In general, a temperature of less than 50° C. is preferred. An operating pressure of around one atmosphere absolute will give good removal of sulfur oxides and nitrogen oxides for the concentrations normally encountered in flue gases to be treated for removal of these compounds even though higher pressure would normally be beneficial for improved sulfur oxide and nitrogen oxide removal.

It is beneficial to use, as a coal to carry out the method of the present invention, a coal that has been obtained for its fuel value. The fuel value of the coal will be upgraded by the scrubbing process.

The fact that the reaction products of the method of the present invention are primarily salts in aqueous solution is beneficial in that these salts can readily be disposed of.

The process of the present invention can be used primarily to control emissions of sulfur oxides or nitrogen oxides. Alternatively, the process could be used primarily as a means of partial de-ashing of appropriate low rank coals by using essentially free or low cost aqueous acidic solution prepared from the sulfur oxide and nitrogen oxide content of a gas. If the process can be used to accomplish both purposes simultaneously, the results obtained will be more beneficial.

What I claim as my invention is:

1. A method of wet scrubbing a gas stream containing acid gas pollutants, said pollutants being at least one of a sulfur oxide or a nitrogen oxide, said method comprising introducing said gas and a slurry of a suitable low rank coal in water into any appropriate type of slurry-gas contactor, said coal having exchangeable cations associated with it, contacting said gas with said slurry while controlling pH in a range of 2.5 to 6, many of said cations being replaced during said contact by hydrogen ions formed in siad slurry, said exchangeable cations combining with said pollutants to form soluble salts in said slurry, said method removing substantially all of said pollutants from the gas stream and removing pollutants from and reducing the ash content of the coal, removing the gas stream and removing the slurry from the contactor, separating the liquid part of the slurry from the coal, the soluble salts being taken away from the coal in the liquid slurry.

2. A method as claimed in claim 1 wherein the low rank coal is selected from the group of lignite, brown coal or sub-bituminous coal.

3. A method as claimed in claim 2 wherein the coal is pre-treated prior to introducing it into the slurry-gas contactor in order to replace many of the exchangeable cations found naturally in said coal with more desirable cations.

4. A method as claime din any one of claims 1, 2 or 3 including the steps of filtering and washing the coal so that the coal is substantially ash free.

5. A method as claimed in any one of claims 1, 2 or 3 wherein a plurality of slurry-gas contactors are used and the method is carried out in successive stages in each contactor, said pH being controlled to improve the solubility of sulfite salts and to better insure a minimum formation of carbonate salts.

6. A method as claimed in any one of claims 1, 2 or 3 wherein there are a plurality of acid-gas contactors and the method is carried out in stages in each contactor, recycling the pollutants to one or more of the contactors in order to control the effluent pH.

7. A method as claimed in any one of claims 1, 2 or 3 wherein the process is carried out on a continuous basis.

8. A method as claimed in any one of claims 1, 2 or 3 wherein the temperature of the process is less than 50° C. and the pressure is approximately 1 atmosphere.

9. A method as claimed in any one of claims 1, 2 or 3 wherein the particle size of the coal ranges from 50 to 200 μm.

10. A method as claimed in any one of claims 1, 2 or 3 wherein the particle size of the coal is approximately 75 μm.

* * * * *